United States Patent [19]
Eckert

[11] Patent Number: 5,769,924
[45] Date of Patent: Jun. 23, 1998

[54] METHOD OF TREATING ALUMINUM WITH CHLORINE PRODUCED FROM CHLOROCARBON COMPOUNDS

[76] Inventor: C. Edward Eckert, 260 Lynn Ann Dr., New Kensington, Pa. 15068

[21] Appl. No.: 696,600

[22] Filed: Aug. 14, 1996

[51] Int. Cl.$^6$ .................................................. C22B 21/06
[52] U.S. Cl. ............................................ 75/681; 423/500
[58] Field of Search ............................... 423/500; 75/681

[56] References Cited

U.S. PATENT DOCUMENTS 4,525,212  6/1985  Sharma ...................................... 75/681

Primary Examiner—Melvyn Andrews
Attorney, Agent, or Firm—Andrew Alexander

[57] ABSTRACT

A method of liberating or producing chlorine from hexachloroethane, the method comprising the steps of providing a body comprised of solid hexachloroethane and heating the body to a temperature sufficient to cause the solid hexachloroethane to produce hexachloroethane vapors. Thereafter, the hexachloroethane vapors are exposed to a heated surface and the hexachloroethane vapor decomposed utilizing heat from the heated surface to liberate chlorine from the hexachloroethane vapor.

8 Claims, 2 Drawing Sheets

METHOD OF TREATING ALUMINUM WITH CHLORINE PRODUCED FROM CHLOROCARBON COMPOUNDS

BACKGROUND OF THE INVENTION

This invention relates to chlorine, and more particularly, it relates to a method of producing chlorine from chlorocarbon compounds such as hexachloroethane.

Chlorine is widely used in treatment of molten metals such as aluminum to remove dissolved alkali elements, e.g., sodium, potassium, and the like. In addition, chlorine in conjunction with a carrier gas can facilitate removal of hydrogen and inclusions. Aluminum producing facilities can use in excess of 2000 pounds of chlorine per day for fluxing.

While the use of chlorine for treating molten aluminum is highly desirable, its use is not without problems. For example, railroad tank cars, typically containing 60 tons of chlorine often require entire towns to be evacuated when a local derailment occurs. Another concern is maintaining the tank cars or chlorine-containing cylinders in the plant to prevent leaks. That is, chlorine is a highly active chemical and is corrosive to the gas distribution hardware leading to chlorine leaks. Chlorine leaks are very undesirable because of the highly toxic nature of chlorine, which has an OSHA ceiling limit concentration of 1 ppm.

The health hazard presented by chlorine is illustrated by a foundry operation, for example, which typically would use cylinders containing 150 pounds of liquid chlorine. The 150 pounds of liquid chlorine will vaporize to produce 790 standard cubic feet of chlorine gas. Uniformly mixed with air, this quantity chlorine is sufficient to contaminate 790,000,000 cubic feet of airspace. In larger operations where 1 ton to 30 ton cylinders are used, it will be seen that the problem of leakage can be greatly exacerbated. Because of the potential environmental and industrial problems, the use of chlorine for fluxing or treatment of molten metal is often avoided even though it is technically superior to halocarbons and sulfur based compounds such as sulfur hexafluoride.

Thus, it will be seen that there is a great need for a process that permits, the use of chlorine for fluxing, for example, without the transportation and containment problems. The present invention provides a solution to such problems and permits tHe use of chlorine without the attendant problems and storage.

SUMMARY OF THE INVENTION

It is an object of this invention to provide a process for chlorine generation.

It is another object of this invention to provide a process for generating chlorine from a chlorocarbon compound.

It is still another object of this invention to provide a process for liberating chlorine from hexachloroethane.

And still, it is another object of this invention to liberate chlorine from hexachloroethane substantially free of carbon compounds.

Yet, it is another object of this invention to provide a process for fluxing or treating molten aluminum with chlorine or chlorine in combination with a carrier gas, the chlorine produced from hexachloroethane and being substantially free of carbon compounds.

In accordance with these objects, there is provided a method of liberating or producing chlorine from hexachloroethane, the method comprising the steps of providing a body comprised of solid hexachloroethane and heating the body to a temperature sufficient to cause the solid hexachloroethane to produce hexachloroethane vapors. Thereafter, the hexachloroethane vapors are exposed to a heated surface and the hexachloroethane vapor decomposed utilizing heat from the heated surface to liberate chlorine from the hexachloroethane vapor.

DETAILED DESCRIPTION OF THE PREFERRED EMBODIMENTS

Figure 1:
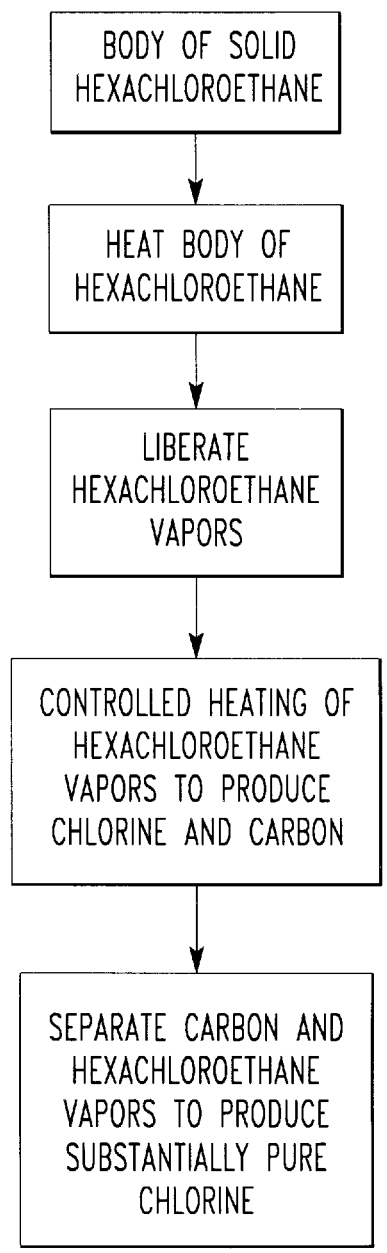
FIG. 1 is a flow chart showing steps in the process of the invention.

Referring now to the flow chart of FIG. 1, it will be seen that relatively pure chlorine can be produced from solid hexachloroethane. In the process of the invention, a body of solid hexachloroethane, which may be comprised of particles of hexachloroethane, is first heated to a temperature sufficient to cause the solid hexachloroethane to produce hexachloroethane vapors. The heating causes the solid particles of hexachloroethane to sublime and thus produce vapors of hexachloroethane. A controlled amount of vapors of hexachloroethane is removed and subjected to further heating until the hexachloroethane decomposes into chlorine and carbon and then the carbon is separated from the chlorine to produce substantially carbon-free chlorine.

The decomposition is carried out at a temperature and pressure which permits the hexachloroethane to decompose in accordance with the following reaction:

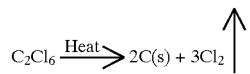

$$C_2Cl_6 \xrightarrow{\text{Heat}} 2C(s) + 3Cl_2 \uparrow$$

This reaction results in the production of 4.75 SCF of chlorine per pound of hexachloroethane decomposed. Further, the reaction produces 0.1 pounds of carbon per pound of hexachloroethane.

It should be understood that it is important to remove the carbon from the chlorine. The presence of carbon creates a serious problem, particularly in aluminum melts. That is, the presence of carbon results in the formation of aluminum carbide ($Al_4C_3$) stoichiometrically at the rate of 0.4 pounds per pound of hexachloroethane used. Thus, the aluminum carbide would contaminate the melt, defeating the purpose of adding chlorine. This contamination problem is one of the difficulties encountered by adding solid hexachloroethane directly to the aluminum melt. Another reason that carbon is removed or separated is to prevent the formation of phosgene ($COCl_2$) which is a poisonous gas having a ceiling limit concentration of 0.1 ppm. Further, unlike chlorine, phosgene is difficult to detect by smell.

For purposes of providing hexachloroethane vapors, solid hexachloroethane is heated in a closed container or pressure vessel to a temperature in the range of about 380° to 660° F. and preferably to a temperature in the range of 400° to 550° F. with a suitable temperature range being about 420° to 530° F. In this temperature range, the solid hexachloroethane sublimes and produces hexachloroethane vapors which are contained in the pressure vessel. A portion of the hexachloroethane vapors can be tapped from the pressure vessel as required for purposes of decomposition to carbon and chlorine.

As noted, a significant quantity of chlorine is generated upon the decomposition of hexachloroethane vapors and thus the amount of hexachloroethane vapors subject to decomposition should be controlled. A portion of hexachloroethane vapors can be decomposed on a continuous or batch basis. Because of the problems noted above when hexachloroethane or carbon enter the melt, it is preferred that the decomposition reaction be carried out to completion, particularly to avoid having hexachloroethane vapors mixed with the chlorine. Because the carbon formed is a solid, it does not present the same separation problems as hexachloroethane vapors. Thus, for purposes of decomposition, a portion of the hexachloroethane vapors is heated to a temperature in the range of about 300° to 1200° F., preferably 500° to 1200° F. It should be noted that as the temperature is increased from 300° to 1200° F., the conversion of hexachloroethane vapors to chlorine increases significantly. This is illustrated by the Van't Hoff isotherm and the vapor pressure expressions as follows:

According to the Van't Hoff isotherm:

$$\Delta F.° = -RT \ln \frac{P_{Cl_2}^3 a_c^2}{P_{C_2Cl_2}}$$

where:

$\Delta F°$ is Gibbs free energy change, relative to standard state

R is ideal gas law constant, 1.99 cal/mole·° K.

T is absolute temperature ° K.

$P_{Cl_2}^3$ is the chloride partial pressure $P_{C_2Cl_6}$ is hexachloroethane vapor partial pressure (sublimes)

$a_c$ is carbon activity (approximately equal to unity)

Thus, $P_{Cl_2} = [(\exp^{-\Delta F/RT})(P_{C_2Cl_6})]^{-1/3}$

Pressure expressions for chlorine and hexachloroethane are therefore:

$\ln P_{Cl_2} = -2448/T°K + 10.24$ $\ln P_{C_2Cl_6} = -4529/T°K + 9.91$

Substituting and solving the equilibrium equation yields:

| T (K.) | T (F.) | $P_{C_2Cl_6}$ (atm) | $P_{Cl2}$ (atm) | % Conv. | $P_{sys}$ (PSIG) |
|---|---|---|---|---|---|
| 300 | 081 | 0.01 | 0.0002 | 4 | <0 |
| 400 | 261 | 0.24 | 0.0710 | 23 | <0 |
| 500 | 441 | 2.34 | 2.12 | 48 | 50.9 |
| 600 | 621 | 10.59 | 19.38 | 65 | 425.9 |
| 700 | 801 | 31.13 | 91.83 | 75 | 1792.8 |
| 1200 | 1701 | 426. | 3803.35 | 90 | 62000. |

Thus, it will be seen from these calculations that at 700° F., the pressure due to chlorine is 91.83 atms and at 1200° F., the pressure due to chlorine is 3803.35 atms. If the decomposition is performed in the same container and at these temperatures, very high pressures result. Because of the high vapor pressure of hexachloroethane, the temperatures and pressures required for acceptable conversion is impractical. The present invention avoids these high pressures by carrying out the decomposition in two steps. In the first step, the solid hexachloroethane is heated to produce hexachloroethane vapors. Then, a portion of the hexachloroethane vapors is further heated to decompose the hexachloroethane vapors to produce chlorine as required.

It has been discovered that decomposition of hexachloroethane vapors to carbon and chlorine can be carried out by exposing the hexachloroethane vapors to a heated surface in a decomposition reactor which is maintained at a temperature in the range of 1200° to 2500° F. and suitably 1800° to 2200° F. Suitable surfaces may be comprised of a filament reactor which is used to produce the high temperatures. Further, preferably the filament material may be comprised of carbon. Carbon surfaces have the advantage that they can capture carbon resulting from the decomposition of the hexachloroethane. Other heated surfaces can comprise a catalytic heated surface comprised of iron or containing iron particles which permit the decomposition of hexachloroethane vapors at lower temperatures.

In the present invention, hexachloroethane vapors can be permitted to issue from the pressure vessel at a controlled pressure, e.g., 60 PSIG, and pass to the decomposition reactor. The hexachloroethane vapors can be decomposed to chlorine and carbon on a continuous basis in the decomposition reactor. The decomposition reactor can have a back pressure regulator to maintain the chlorine in the reactor at a minimum level. Typically, the reactor will have a pressure in the range of 5 to 130 PSIG and is controlled by the temperature and equilibrium relationships.

Figure 2:
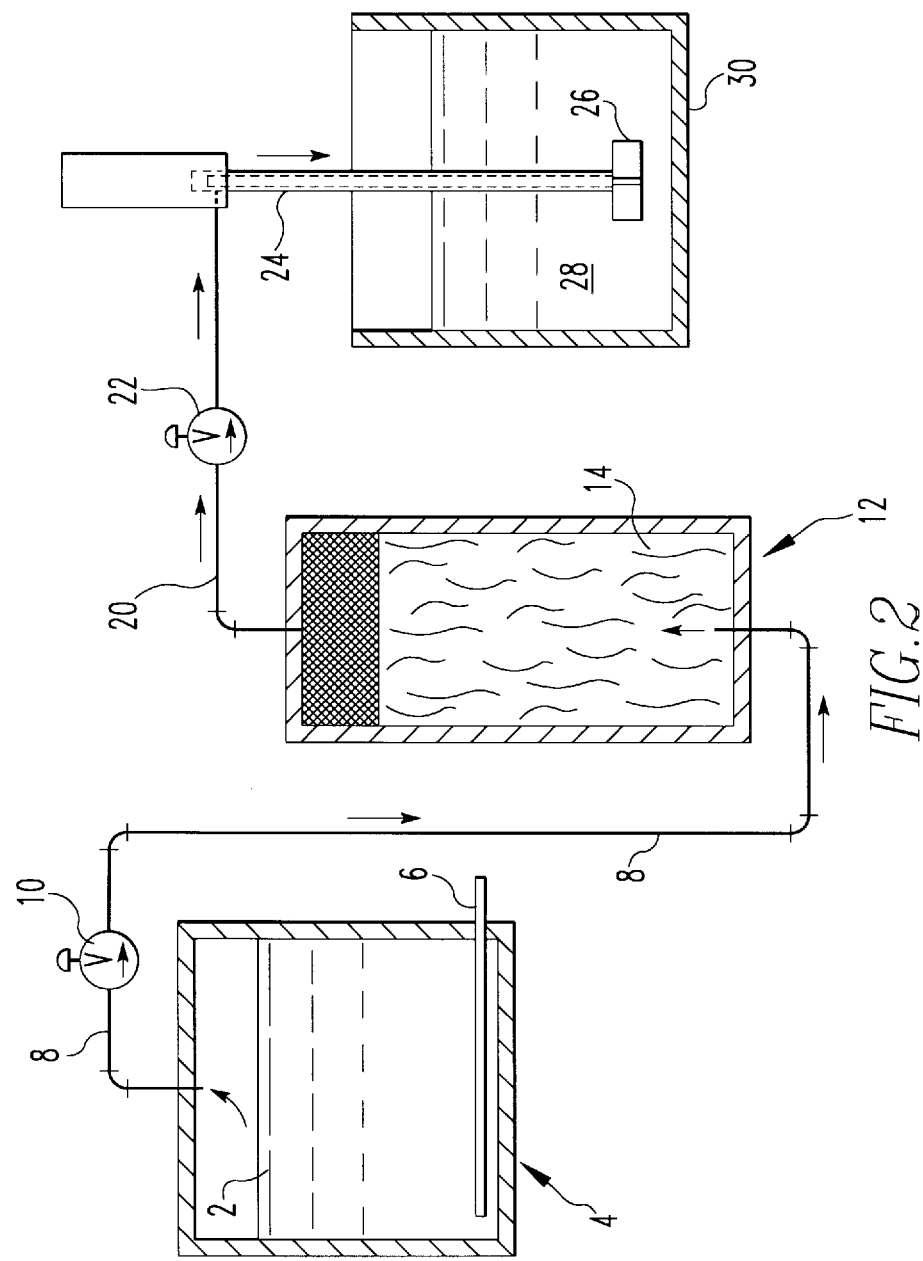
FIG. 2 is a schematic representation of equipment useful in the production of chlorine and treating molten metal in accordance with the invention.

Referring to FIG. 2, it will be seen that for purposes of generating chlorine in accordance with the invention, solid hexachloroethane 2 is provided in a sealed furnace 4 having a heating means 6 which may be a resistance heater, for example. Heat is applied to furnace 4 until solid hexachloroethane sublimes to produce hexachloroethane vapors. The heat input may be controlled to produce a hexachloroethane vapor pressure of 60 PSIG in sealed furnace 4. This requires heating the solid hexachloroethane to a temperature of about 500° F. Hexachloroethane vapors are removed via pipe 8, and the pressure in the furnace may be regulated by valve 10 Hexachloroethane vapors are removed along pipe 8 to decomposition reactor 12. Hexachloroethane vapors pass over or through carbon filaments 14 which may be in the form of grids which are heated locally to about 2000° F. The hexachloroethane vapors are decomposed into carbon and chlorine. The carbon can attach to filament grid 14 and in this way be separated from the chlorine. The chlorine can pass through sieve 18 and along pipe 20 and through valve 22 after which it can be added directly to a hollow shaft 24 for distribution through impeller 26 into molten metal, e.g., aluminum 28 contained in vessel 30. Sieve 18 is provided to capture any hexachloroethane vapors that may pass through the reactor without having been decomposed. The sieve may be comprised of zeolites which will capture hexachloroethane vapors. Or, the sieve may be comprised of "a heater" which is locally super heated to 2600° F., for example, to ensure decomposition of hexachloroethane vapors entrained in the chlorine. Further, sieve 18 is effective in removing carbon particles entrained in the chlorine.

While the process has been described showing decomposition of hexachloroethane vapors in a continuous manner, the decomposition reactor can be operated under batch conditions wherein the decomposition reactor is pressurized with hexachloroethane vapors and then heated to achieve decomposition to chlorine and carbon. A small chlorine cylinder may be located downstream to provide a small reservoir of chlorine for feeding continuously to the aluminum melt.

While the invention has been described with respect to hexachloroethane, it should be understood that it can be used for any chlorocarbon to produce chlorine. Further, this process can be applied to any compound that lends itself to decomposition in this manner.

Chlorine generation in this manner is advantageous in that it avoids the transportation of chlorine across country with its attendant problems. Further, the process has a second advantage in that it avoids on-site storage of large cylinders of liquid chlorine and the problems of leaks. This process has yet another advantage in that if a leak occurs, it can be shut down by removal of heat. Thus, the process provides for a much safer method of producing chlorine on site and avoids the hazards of transportation and storage of large quantities of chlorine.

While the invention has been described in terms of preferred embodiments, the claims appended hereto are intended to encompass other embodiments which fall within the spirit of the invention.

What is claimed is:

1. An improved method of treating a body of molten aluminum with chlorine wherein a gas comprised of chlorine is introduced to said molten aluminum and dispersed through said body including the steps of:

(a) providing a body comprised of solid hexachloroethane;
   (b) heating said body to a temperature in the range of 500° to 600° F. to cause said solid hexachloroethane to produce hexachloroethane vapors; thereafter
   (c) heating said hexachloroethane vapor to a temperature in the range of 600° to 1200° F.;
   (d) decomposing said hexachloroethane vapor and liberating chlorine from said hexachloroethane vapor; and
   (e) introducing said chlorine to said body of molten aluminum.

2. The method in accordance with claim 1 wherein the body of hexachloroethane is heated to a temperature in the range of 300° to 800° F.

3. The method in accordance with claim 1 wherein the body of hexachloroethane is heated to a temperature in the range of 500° to 600° F.

4. The method in accordance with claim 1 wherein the body of hexachloroethane is heated to a temperature in the range of 510° to 550° F.

5. The method in accordance with claim 1 including maintaining the hexachloroethane vapors at a pressure in the range of 15 to 450 PSIG.

6. The method in accordance with claim 1 including maintaining said heated surface at a temperature in the range of 700° to 3100° F.

7. The method in accordance with claim 1 including utilizing said heated surface to heat said hexachloroethane vapors to a temperature in the range of 300° to 1200° F.

8. The method in accordance with claim 1 including utilizing said heated surface to heat said hexachloroethane vapors to a temperature in the range of 500° to 1200° F.

* * * * *